HARRY PUTTERMAN
*INVENTOR.*

BY S. A. Giarratana
Francis L. Masselle
ATTORNEYS

March 8, 1966 H. PUTTERMAN 3,239,775

PULSE GENERATOR HAVING A BACK DIODE AND A TUNNEL DIODE

Filed Nov. 12, 1963 2 Sheets-Sheet 2

HARRY PUTTERMAN
*INVENTOR.*

BY S. A. Giarratana
Francis L. Masselle
ATTORNEYS

United States Patent Office 3,239,775

Patented Mar. 8, 1966

3,239,775

PULSE GENERATOR HAVING A BACK DIODE AND A TUNNEL DIODE

Harry Putterman, Elizabeth, N.J., assignor to General Precision Inc., Little Falls, N.J., a corporation of Delaware Filed Nov. 12, 1963, Ser. No. 322,972
2 Claims. (Cl. 331—107)

This invention relates to a pulse generator and more particularly to a circuit utilizing semi-conductor devices for producing high frequency pulses.

Electrical circuits providing an output in the form of a plurality of pulses are well known in the art. The most common of these pulse generating circuits are those which fall in to the family commonly known as trigger circuits. These trigger circuits are capable of almost instantaneous jumps from one stable operating condition to a second equally stable condition. The now famous Eccles-Jordan circuit is a prime example of such a bistable trigger circuit. The controlling part of this circuit consists of a pair of parallel resistance-capacitance networks connected one each between the anode of one and grid of another vacuum tube triode, and vice versa. If the resistances of the parallel combination are removed, a free-running circuit which has two semi-stable states with oscillation between them results. This circuit, normally known as a free-running multivibrator, utilizes the slow change voltage characteristics of a capacitor to operate the circuit between its semi-stable states. The RC time constants of this circuit determine the number of pulses per unit of time appearing in the output.

With the advent of semi-conductor devices, more notably the transistor, new regenerative switching circuits were developed. Instead of vacuum tubes, two transistors were used as the switching devices. Capacitors, however, were still utilized and were connected between the base of each transistor to the collector of the other transistor, respectively. Resistors were still used to provide RC charging and discharging paths. These multivibrators, as well as those using vacuum triodes, were limited in the frequency of the output pulses due to the use of a capacitor. With the modern day emphasis on high speed circuits, a need soon developed for a simple ultra-high frequency, self-sustained pulse generator continuously variable in its output and repetition rate over a wide range of frequencies in the order of one to one hundred megacycles. The circuit of the present invention meets these requirements.

The transistor, because of its unique characteristics, makes an excellent switching device. It is of small size, it is capable of exceedingly fast operation, it can operate under severe conditions of shock and vibration, it is quiet during switching, and it is free of the usual problems associated with mechanical switches such as wear, fatigue, and contact pitting. In switching circuits, the transistor performs functions similar to those often performed by vacuum tubes, and in pulse circuits the ability of the device to change level or state rapidly is of great importance.

Another of the family of semi-conductor devices, namely the back diode, possesses characteristics which makes it extremely useful as a circuit element. This device, when driven by an increasingly negative voltage, maintains an essentially constant current until a certain point is reached at which the diode "breaks down." At this point small voltage changes cause increasingly larger current changes, until a point is reached at which the diode breaks down completely. This breakdown voltage is reproducible and non-destructive, assuming that the breakdown current is sufficiently limited. As can be noted, this feature of the diode makes it an excellent voltage reference element, and when the diode is operated in this breakdown region its terminal voltage serves as a voltage standard or reference. This breakdown feature of the back diode can be utilized for other purposes also, as will be pointed out in the description of the operation of the present invention.

The newest member of the semi-conductor family, the tunnel diode, exhibits negative resistance characteristics which makes it a valuable element of various electronic circuits. Briefly, the tunnel diode possesses a low voltage positive resistance region and a high voltage positive resistance region with a negative resistance region between the both. When the tunnel diode is operated in either of the two positive resistance regions, it is in a stable state. Since it can be switched between its stable states very quickly, it can be seen that there is provided another bistable switching component.

By properly combining the above semi-conductor devices into a single circuit, a single stage self-sustained pulse generator can be achieved. This circuit utilizes the unique characteristics of each of the semi-conductor elements to provide for an improved pulse generating circuit.

The invention comprises generally a semi-conductor circuit which includes a transistor, a negative resistance element such as a tunnel diode or the like connected to the transistor emitter, and a back diode included in a portion of the transistor base network. A variable base resistor is included in the other portion of the base network to provide a means of controlling the repetition rate of the pulse output. A second variable resistor, an emitter resistor, is connected between the transistor emitter and a voltage source. This variable resistor provides the control means for varying the magnitude of the output voltage pulses. The remainder of the circuit comprises a fixed resistor in the collector portion.

Briefly, according to the invention, when the circuit is energized, the back diode breaks down, bringing the base to a more negative potential with regard to the emitter. The produces a forward bias across the base-emitter junction and the transistor is caused to go on. With the transistor in its on position, the current in the collector begins to rise at a rate dependent upon the value of the base resistance. When this current minus the emitter current (the latter being dependent upon the value of the value of the emitter resistance) reaches a value greater than the peak current of the negative resistance element, in this case a tunnel diode, the latter switches from its low voltage state to its high voltage state. This causes a voltage drop at the emitter, and when the base tries to follow this drop, the back diode breaks down completely. In essence reverse base drive is thus provided, and the transistor turns off. With the transistor being off, the back diode and tunnel diode return to their initial states and the circuit is prepared to repeat this cycle. The cycle is then repeated at a very rapid rate dependent only upon the value of the base and emitter resistances and the characteristics of the semi-conductor elements utilized.

Accordingly, a principal object of the present invention is to provide an improved pulse generating circuit.

Another object of this invention is the provision of a non-reactive, high frequency, self-sustained pulse generator in which the output is continuously variable in its amplitude and repetition rate.

A further object of this invention is to generate a pulse train using a minimum number of components.

Still another object of this invention is the provision of a semi-conductor pulse generator circuit in which there is minimum dissipation of the active circuit elements.

A still further object of this invention is to provide a pulse generator which utilizes sub-miniature components.

A still further object of this invention is the provision of an improved pulse generator which uses no reactive components.

Still another object of this invention is to provide a pulse generating circuit in which the repetition rate of the pulse output is continuously variable by means of a variable resistance.

A still further object of this invention is the provision of a pulse generator in which the output level is made variable by means of a variable resistance and is further made independent of supply voltages.

A still further object of this invention is the provision of a transistor pulse generator circuit, in which the transistor can be operated in the non-saturated mode of operation without increasing the overall dissipation.

Still another object of this invention is to provide a transistor pulse generator in which the transistor is in its common base mode of operation during its off period to thereby utilize the maximum switching capability of the transistor.

A still further object of this invention is to provide a single stage semi-conductor pulse generating circuit which utilizes the combination of a single transistor, a back diode, and a tunnel diode, to provide an ultra-high frequency output.

Further objects and advantages of the present invention will become readily apparent as the following detailed description of the invention unfolds and when taken in conjunction with the accompanying drawings, wherein.

Figure 1:
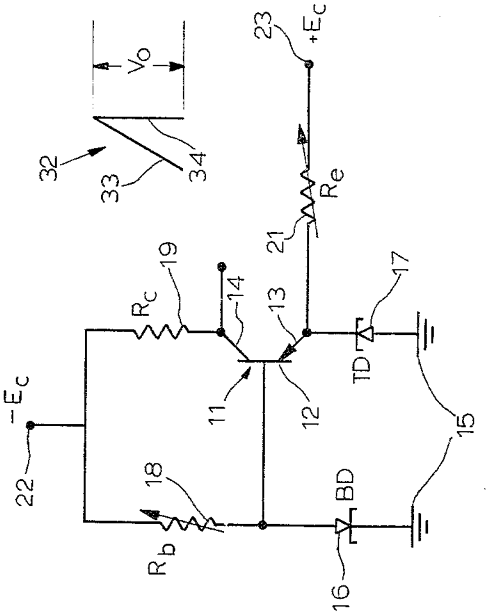
FIG. 1 is a circuit diagram of one embodiment of the invention.

As shown in FIG. 1, the pulse generating circuit of the present invention comprises a transistor 11, with a base 12, emitter 13, and a collector 14. Connected between the base 12 and ground 15, is a back diode 16, while the remaining active element of the circuit, tunnel diode 17, is connected between the emitter 13 and ground 15. Although a back diode and tunnel diode are shown, it should be noted that other breakdown and negative resistance elements, respectively, might be used. The remainder of the circuit consists of passive elements, namely a variable resistor 18 connected between the base 12 and a negative voltage source 22, a fixed resistor 19 connected between the collector 14 and the same negative source 22, and a variable resistor 21 connected between the emitter 13 and a positive voltage source 23. Since transistor 11 is of the PNP type, back diode 16 is connected with its cathode to ground and its anode to base 12, while tunnel diode 17 is connected with its anode to ground and its cathode to emitter 13. The reasons for connecting these active elements in this manner will become evident upon the description of the operation of the pulse generator, which is set forth below.

As mentioned previously, tunnel diode 17 is a semi-conductive element possessing a pair of positive voltage resistance regions with a negative resistance region between them. Depending on the particular pulse generating circuit in which it is used, this diode can be made from the normal semi-conductive materials, i.e., germanium, silicon, galium arsenide, etc. The tunnel diode exhibits the characteristics shown generally by the current-voltage plot of FIG. 2. Looking now at this curve, the low voltage positive resistance region is represented by that portion of the curve between operating points 25 and 26. When the diode is operating in this portion of the curve it is said to be in its low voltage state. Operating point 26 is that point normally known as the peak current point, namely the beginning of the negative resistance region. At point 26 the tunnel diode provides a current, $I_P$, known as the peak current of the diode, and also a corresponding voltage, $V_P$. That portion of the curve between points 26–27, is known as the negative resistance region. This is the unstable portion of the tunnel diode and it traverses this portion of the curve very quickly upon the current reaching a value equal to or greater than $I_P$. Point 27, usually referred to as the valley current point, is the beginning of the high voltage positive resistance region. The current at this point is normally designated as $I_V$, while the voltage is designated by $V_V$. When the tunnel diode is operated in that portion of the curve to the right of operating point 27, it is said to be in its high voltage state. A stable operating point can be chosen for this portion of the curve which will be dependent on the amount of bias supplied to the tunnel diode and the particular circuit components used in the tunnel diode circuit. One such stable operating point has been designated generally as 28, with its current value of $I_H$, and a voltage value of $V_H$. Reference numeral 24 on the curve indicates a point of operation corresponding to small negative values of diode current and voltage, and can be considered merely an extension of the low voltage state for small negative values. The significance of the various operating points as shown on the curve of FIG. 2, will be further explained in conjunction with the operation of the circuit of the present invention.

Figure 3:
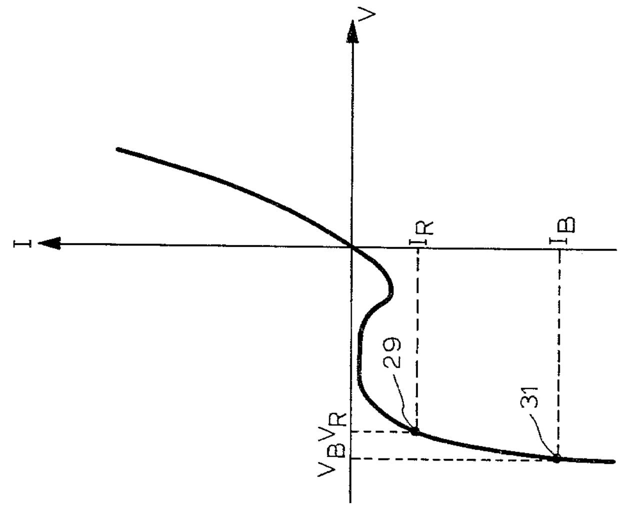
FIG. 3 is a current-voltage plot showing the back diode characteristics.

Back diode 16, which is normally used as a voltage reference device, has the characteristics shown generally on the current-voltage plot of FIG. 3. When small increasing negative voltages are applied to this diode, the current remains substantially unchanged. As these negative voltages become larger however, a certain point is reached at which the back diode breaks down. This first point is indicated on the curve as 29, and as can be seen there is a noticeable change in the current. The voltage at this point is designated as $V_R$ while the current is shown as $I_R$. If the voltage is made more negative, a value of voltage, $V_B$, is reached at which time the diode breaks down completely. This complete breakdown results in operation on that portion of the back diode curve which is almost parallel to the current axis. During complete breakdown, the current changes significantly, as is shown by the current value $I_B$ of FIG. 3. A second operating point, 31, is shown as indicating the complete breakdown condition. The current-voltage plot of back diode 16 as designated in FIG. 3 will be referred to again below in the description of the operation of the present invention.

Figure 2:
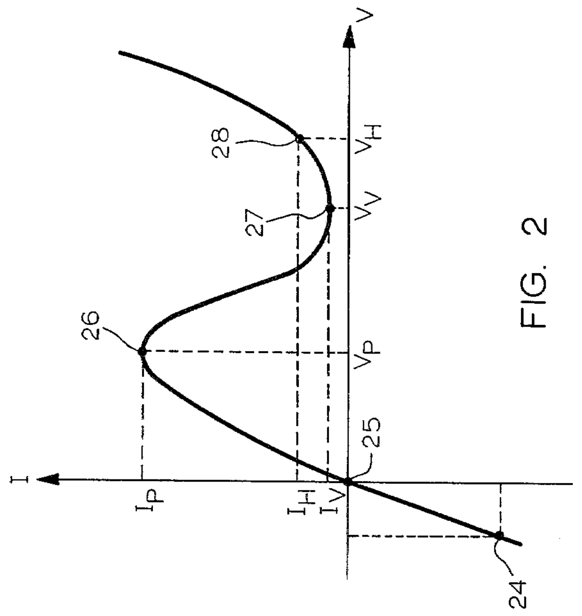
FIG. 2 is a current-voltage plot showing the tunnel diode characteristics.

In describing the operation of the circuit of FIG. 1, reference will be made to the tunnel diode characteristics as indicated by the plot of FIG. 2, and the back diode characteristics as indicated by the current-voltage plot of FIG. 3. Accordingly, when operating points regarding the tunnel diode are mentioned, FIG. 2 should be consulted, while the operation of the back diode will require reference to the operating points designated in FIG. 3.

As mentioned previously, transistor 11 of FIG. 1 is the PNP type. If it is made of the semi-conductive material germanium, back diode 16 and tunnel diode 17 should also be made of the same material. Thus, the circuit will operate in a similar range of voltage and current values.

Describing now the operation of the pulse generator of the present invention, the application of power to the circuit results in back diode 16 breaking down, and its voltage drops to the value $V_R$. At this time back diode 16 is at operating point 29 of its current-voltage characteristic curve. Because of the $R_e$ current flowing in the emitter circuit tunnel diode 17 exhibits a small negative voltage as indicated by operating point 24 of FIG. 2. If the resistance $R_e$ were not in the emitter circuit tunnel diode 17 would be at zero volts as indicated by point 25 on its current-voltage characteristic curve. Assuming the active elements are composed of germanium, the voltage across back diode 16 would be approximately −0.50 volt, while the voltage across the tunnel diode 17 would be —0.05 volt. With these values the base-emitter junction of transistor 11 would be forward biased with 0.55 volt and accordingly, would be switched on.

With transistor 11 being turned on, there is an immediate current rise in the collector 14. The rise time of this collector current is dependent upon the amount of base drive available, which of course is dependent upon the value of the variable resistor 18. In other words, the slope of the output current curve is proportional to the amount of base resistance provided by variable resistor 18. The potential of the base 12, is of course dependent upon the value of variable resistor 18, which in turn controls the transistor output as indicated above.

The collector current and voltage continue to rise until this current, $I_c$, minus the current, $I_{R_e}$ which flows through resistor 21, reach a value which is equal to the current $I_P$ of tunnel diode 17. During this time tunnel diode 17 is being operated in its low voltage state, namely between the points 24–26 of FIG. 2. When the difference of the collector and emitter currents exceed point 26 on the curve, however, tunnel diode 17 then switches to its high voltage state. This quick change from point 26 to point 28 on the curve, causes the voltage across tunnel diode 17 to increase quickly from $V_P$ to the value of $V_H$. The voltage on emitter 13 drops a corresponding amount, and when the voltage on base 12 tries to follow that drop, which is greater than the breakdown voltage of the back diode, back diode 16 breaks down completely and reverse base drive is applied to transistor 11 to turn it off. Back diode 16 is then at its operating point indicated by 31 on FIG. 3. Since this reverse drive is derived from a low impedance source, the transistor 11 is turned off very rapidly from the emitter 13. Thus the maximum switching capabilities of transistor 11 are utilized.

Output curve 32 of FIG. 1 shows the output characteristics, with that portion designated at 33 showing the rise while the transistor is on, while reference numeral 34 indicates the sudden drop when transistor 11 is turned off. The output voltage, $V_o$, at the time transistor 11 is turned off is equal to $(I_P+I_{R_e})R_c$, and this value can be kept below the saturation level of transistor 11.

With transistor 11 turned off, the voltage across tunnel diode 17 then drops and the diode goes back to its original low voltage operating state. Referring to FIG. 2, the tunnel diode returns to its original operating point namely that indicated by point 24. This action causes the voltage across back diode 16 to become more positive, and it instantaneously returns to its operating point 29 of FIG. 3. The above changes take place instaneously, and the circuit, since the initial conditions are restored, is prepared to repeat the cycle, which it immediately proceeds to do.

Thus it is seen, that there is provided a self-sustained, non-reactive, high frequency pulse generator, the output of which is continuously variable in amplitude and repetition rate. Since variable resistor 18 controls the rise time of the output of the transistor 11, it can be seen that this resistor in such manner controls the repetition rate of the pulses appearing in the output. If the rise portion 33 of output curve 32 is made steeper a faster repetition rate will occur, and likewise, if the slope of rise portion 33 is decreased, there will be fewer pulses per unit of time.

Also, by varying the value of resistance 21, the point at which transistor 11 is turned off can be controlled, which directly controls the amplitude of the output pulses appearing at collector 14. Since this resistance controls the amount of current which is substracted from $I_c$, operating point 26 can be reached at an output level dependent upon the value of resistance provided by variable resistor 21 in the emitter circuit. It other words, the end of rise portion 33 of output curve 32 can be made to cease at any particular amplitude desired. If a fixed amplitude is desired in the output, variable resistor 21 can be left out of the circuit completely. If this is done, tunnel diode 17 will be at zero volts as indicated by operating point 25 of FIG. 2, and the transistor will turn off at a lower output level which will remain constant.

Figure 4:
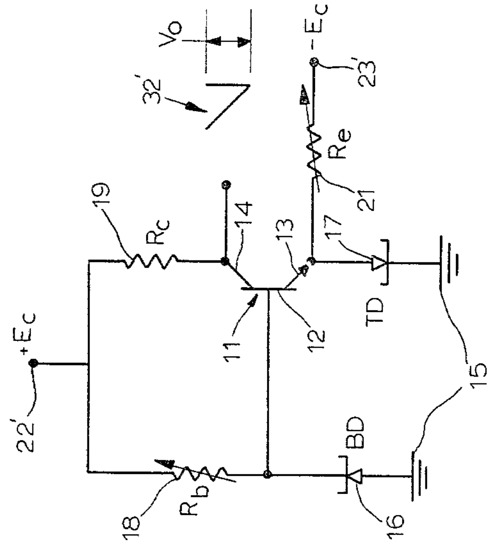
FIG. 4 is a circuit diagram of another embodiment of the invention.

FIG. 4 is a circuit diagram illustrating an alternative embodiment of the invention in which a NPN type transistor is used. The circuit of FIG. 4 includes the same components as the circuit of FIG. 1 except that back diode 16 is now connected with the anode to ground and its cathode to base 12, while tunnel diode 17 has its cathode connected to ground and its anode connected to emitter 13. The supply voltages are also reversed, namely 22′ is a positive voltage source while 23′ is a negative voltage source. The operation of the circuit is the same as that described with regard to FIG. 1, but due to the reversal of the polarities of the components involved, the output curve 32′ shows the resulting negative voltage pulse.

As mentioned previously, the semi-conductive materials of which the active elements of the circuit of the present invention are composed, need not be restricted to germanium. For instance, if a silicon transistor were used, a tunnel diode composed of either germanium, silicon, or galium arsenide, can be used. In such a circuit, a back diode made of galium arsenide would provide the best results.

The above description is of preferred embodiments of the invention, and many modifications may be made thereto without departing from the spirit and scope of the invention, which is defined in the appended claims.

What is claimed is:

1. A pulse generating circuit comprising a single stage including a transistor having a base, emitter and collector, a voltage source producing a first potential and a second potential, a back diode coupled between the base of said transistor and said second potential, a tunnel diode coupled between the emitter of said transistor and said second potential, a variable resistor coupled between the base of said transistor and said first potential, and a fixed resistor coupled between the collector of said transistor and said first potential, wherein said transistor is caused to continuously alternate between its on and off conditions upon the breakdown of said back diode, and upon the change of said tunnel diode from its low voltage state to its high voltage state, respectively.

2. A pulse generator comprising a transistor having a base, emitter and collector and operative to control conduction between said emitter and collector in response to a voltage between said emitter and base, a source of D.C. power having a terminal of a first polarity, a terminal of a second polarity and a ground terminal, a first variable resistance connected between said base and said terminal of said second polarity, a second variable resistance connected between said emitter and said terminal of said first polarity, a fixed resistance connected between said collector and said terminal of said second polarity, a back diode connected between said base and said ground terminal, and a tunnel diode connected between said emitter and ground terminal.

References Cited by the Examiner

UNITED STATES PATENTS

| | | | |
|---|---|---|---|
| 3,146,416 | 8/1964 | Bobon et al. | 331—107 |
| 3,170,124 | 2/1965 | Candilis | 331—107 |

FOREIGN PATENTS

| | | |
|---|---|---|
| 1,156,845 | 11/1963 | Germany. |
| 911,115 | 11/1962 | Great Britain. |

ROY LAKE, *Primary Examiner.*

JOHN KOMINSKI, *Assistant Examiner.*